Dec. 6, 1966 A. F. TURNER ETAL 3,289,647
COOLING SYSTEM FOR MULTI-UNIT ROTARY MECHANISMS
Filed Aug. 24, 1964 5 Sheets-Sheet 1

INVENTORS
ALEC F. TURNER
HOWARD R. CORWIN, JR
BY
Julian Falk
ATTORNEY

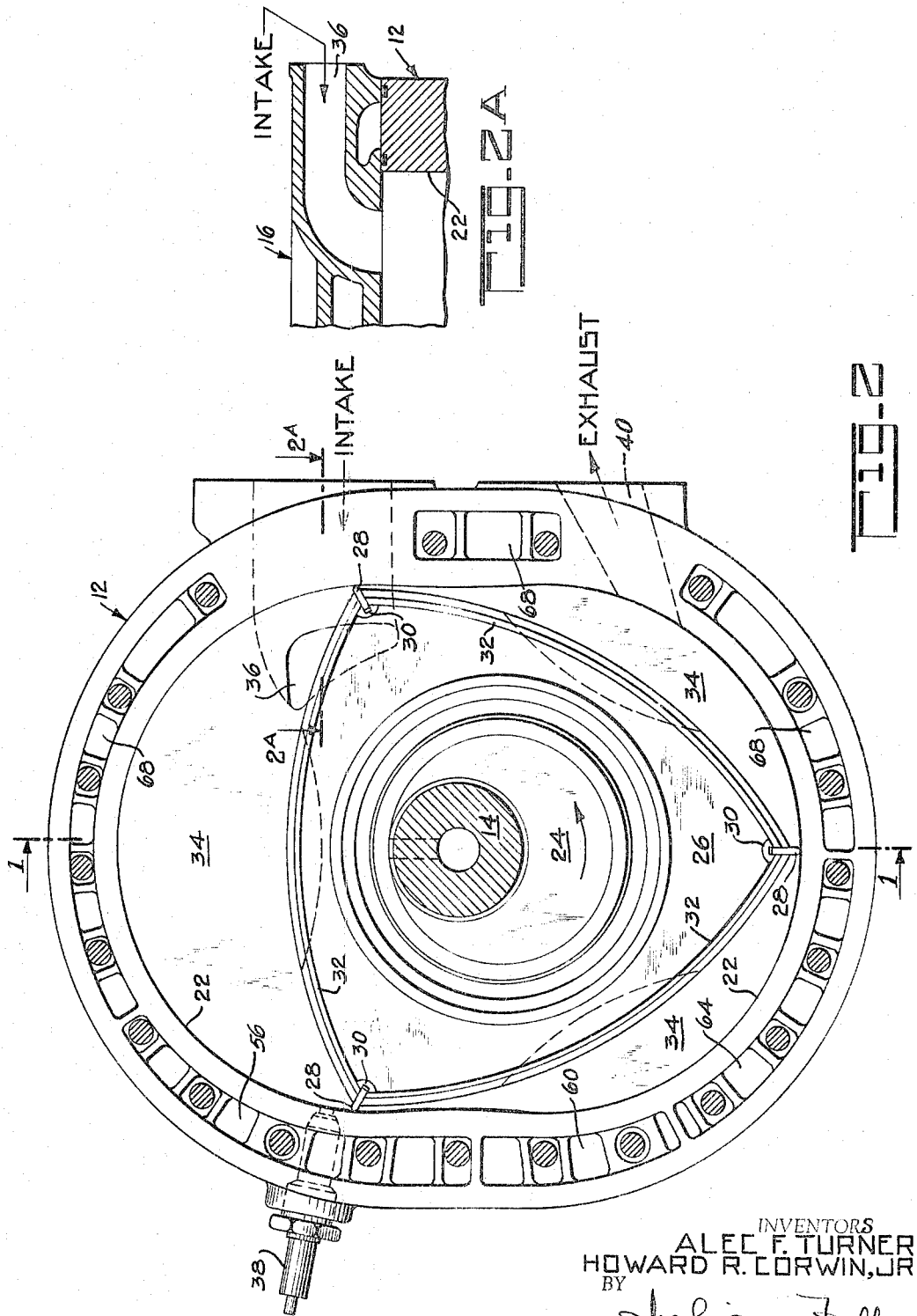

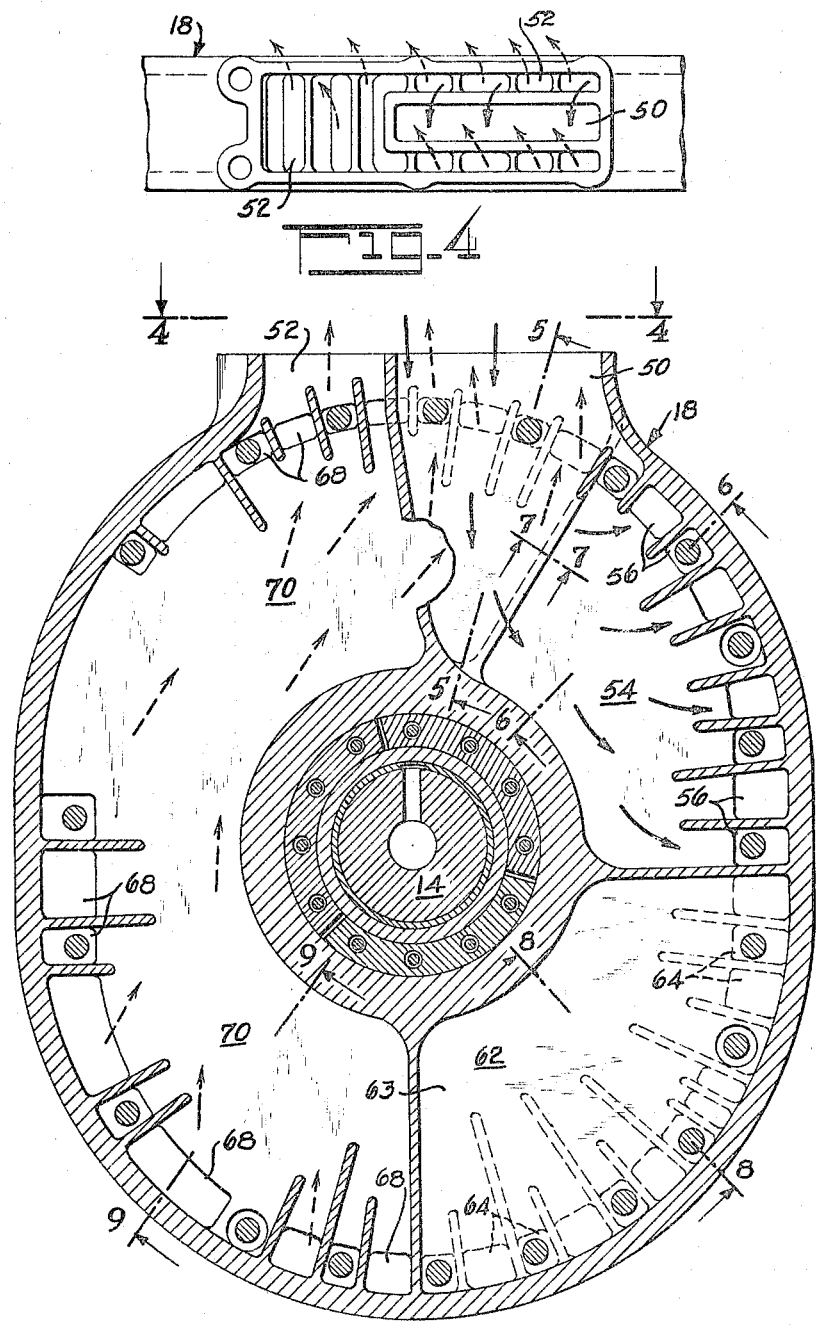

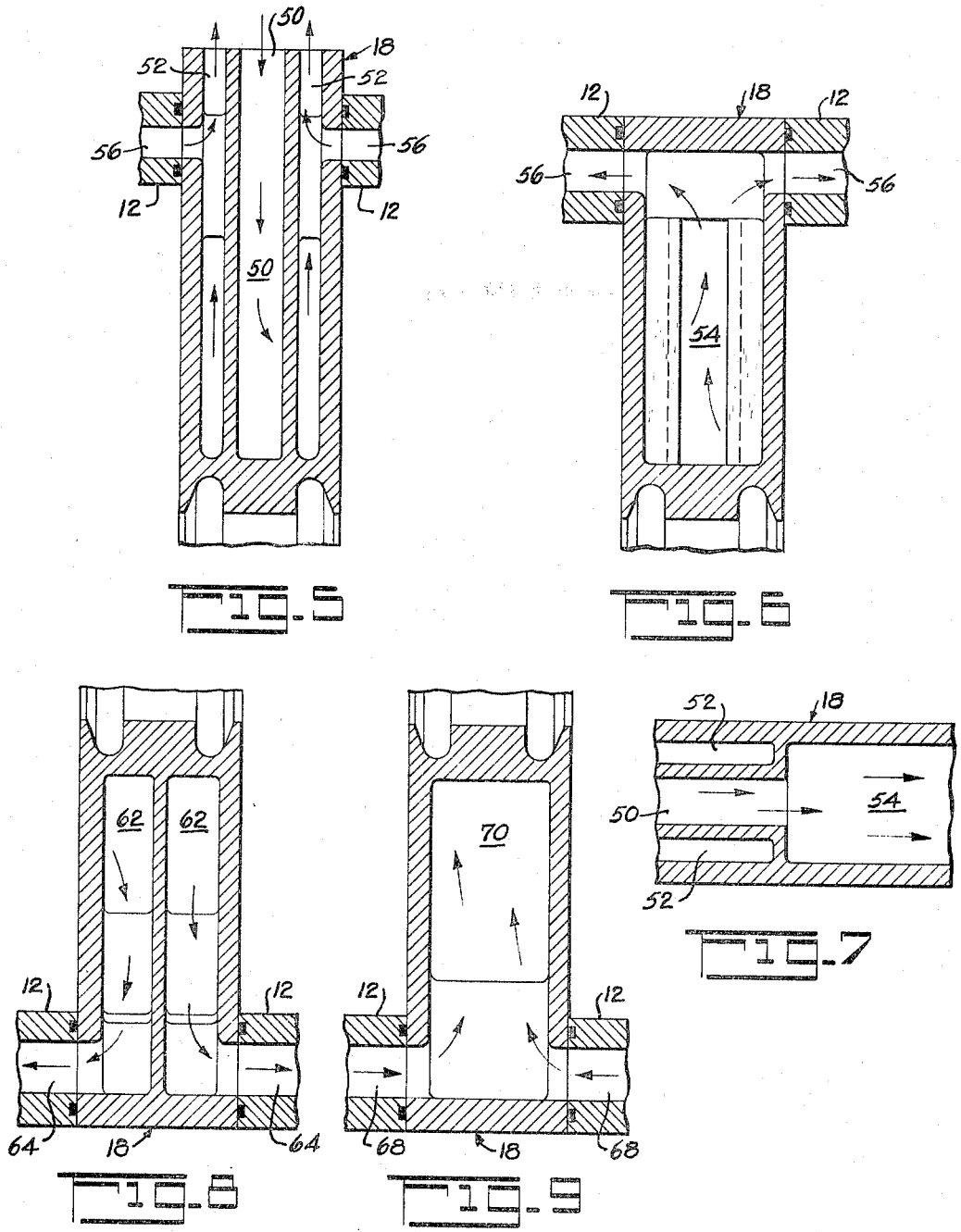

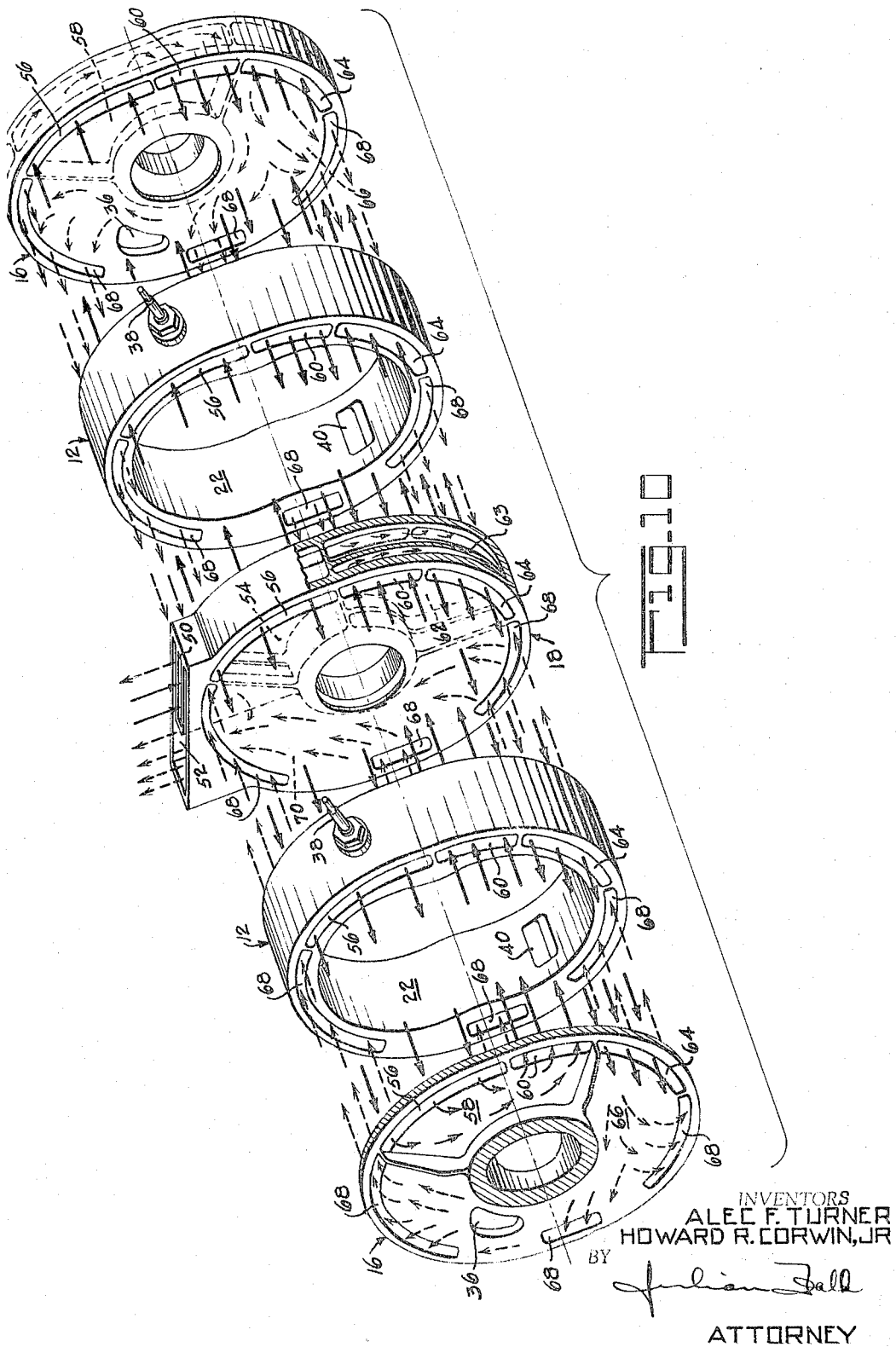

United States Patent Office 3,289,647
Patented Dec. 6, 1966

3,289,647
COOLING SYSTEM FOR MULTI-UNIT
ROTARY MECHANISMS
Alec F. Turner, Paramus, and Howard R. Corwin, Jr., North Caldwell, N.J., assignors to Curtiss-Wright Corporation, a corporation of Delaware
Filed Aug. 24, 1964, Ser. No. 391,670
7 Claims. (Cl. 123—8)

This invention relates to rotary mechanisms and is particularly directed to a liquid cooling system for a multi-unit rotary mechanism.

The invention is particularly useful in rotary mechanisms which are so arranged to operate as a combustion engine wherein said combustion engine has a cycle of operation including the four phases of intake, compression, expansion and exhaust. However, it should be understood that the invention has application in other types of rotary mechanisms such as fluid motors and fluid pumps. A rotary combustion engine of the type which may be used in conjunction with the present invention is shown in U.S. Patent 3,007,460 issued November 7, 1961 to Max Bentele et al.

As explained in said patent, in such rotary combustion engines the heat input to the other body resulting from the engine gas cycle, is not uniform around the periphery of the outer body. This is so because each of the various phases of the engine cycle always takes place adjacent to the same portion of the outer body. As a result, the portion of the engine outer body adjacent to which combustion phase takes place has a much higher heat input rate than other portions of said outer body. It is therefore of prime importance to provide a cooling system which will minimize temperature variations in the outer body around its periphery whereby any resultant thermal stresses and/or thermal distortions present in the outer body during operation are relatively low.

As stated above, the present invention is drawn to a novel liquid coolant system for a multi-unit rotary mechanism. The rotary mechanism of the invention has an outer body construction which includes at least two axially aligned and interconnected rotary combustion engine units. The outer body is formed by a pair of coaxially-spaced end walls each being connected to a rotor housing or peripheral wall which peripheral walls are in turn interconnected with a common intermediate wall structure.

In order to obtain maximum performance from the multi-unit rotary combustion engine, it is important that the operating conditions for each of the individual units be maintained substantially the same. Thus, it will be apparent that the operating temperature of the individual units must be maintained substantially equal so as to minimize variations in the temperature between said units. In order to accomplish this objective, the liquid cooling system for each of the units should be so arranged such that the temperature and pressure of each of the units will be balanced by providing sufficient flow of liquid coolant to the relatively hot portions of the outer periphery of said individual units in order to minimize variations of the temperature of the outer body around its periphery.

In the present invention these objectives are carried out in general by providing an inlet means in the common intermediate wall which inlet means directly feeds relatively cool liquid coolant to a plurality of equal length passageways leading from the intermediate wall to each of the two peripheral walls in the relatively hot portion thereof and to each of the end walls. A second group of passageways connected to the first-mentioned passageways leads back from the end walls to the intermediate wall wherein the liquid coolant from each end wall is then recirculated back toward the end walls. The liquid coolant is then returned to the intermediate wall through another group of passageways wherein the liquid coolant is fed to an outlet means in the intermediate wall for discharge from the outer body. Each passageway leading to and from the intermediate wall to an end wall is equal in length and area to an associated passageway leading from the intermediate wall to an opposite end wall so that substantially the same amount of liquid coolant will be supplied to each of the units of the rotary combustion engine which liquid coolant will be under substantially equal pressures and the operating temperature of the individual units will therefore be balanced. This results in the engine being able to operate with maximum efficiency with respect to the temperature operating conditions. Further, since the inlet and outlet means are both provided in the intermediate wall it will be apparent that a relatively simple and compact manifold structure can be used which permits savings in weight and overall engine dimensions.

Accordingly, it is one object of the invention to provide a novel and improved liquid coolant means for the outer body of a multi-unit rotary mechanism.

It is another object of the invention to provide a liquid cooling means for the outer body of a multi-unit rotary mechanism wherein the liquid coolant flow between the units of said multi-unit mechanism is substantially balanced.

It is still another object of the invention to provide a novel and improved liquid cooling means for the outer body of a multi-unit rotary mechanism wherein temperature variations over said outer body are substantially minimized.

It is a further object of the invention to provide a novel and improved liquid cooling means for the outer body of a multi-unit rotary mechanism which rotary mechanism is characterized by having variations in the heat input to the outer body thereof and wherein said liquid cooling means comprises a plurality of liquid coolant passageways which diverge from a single source between the units of said multi-unit rotary mechanism for conducting heat away from the relatively hot portions of the outer body thereof so that temperature variations in said outer body are substantially reduced.

Other objects and advantages of the invention will be best understood upon reading the following detailed description with the accompanying drawings in which:

FIG. 2 is a sectional view taken along line 2—2 of FIG. 1;

FIG. 2A is a partial sectional view taken along line 2A—2A of FIG. 2;

FIG. 3 is a sectional view of the intermediate wall of the multi-unit rotary mechanism of the invention taken along line 3—3 of FIG. 1;

FIG. 4 is a plan view taken along line 4—4 of FIG. 3;

FIGS. 5-9 are sectional views taken along lines 5—5, 6—6, 7—7, 8—8 and 9—9 of FIG. 3; and FIG. 10 is a diagrammatic exploded view of the rotary combustion engine of FIG. 1 showing the circulation of the liquid coolant therethrough.

Figure 1:
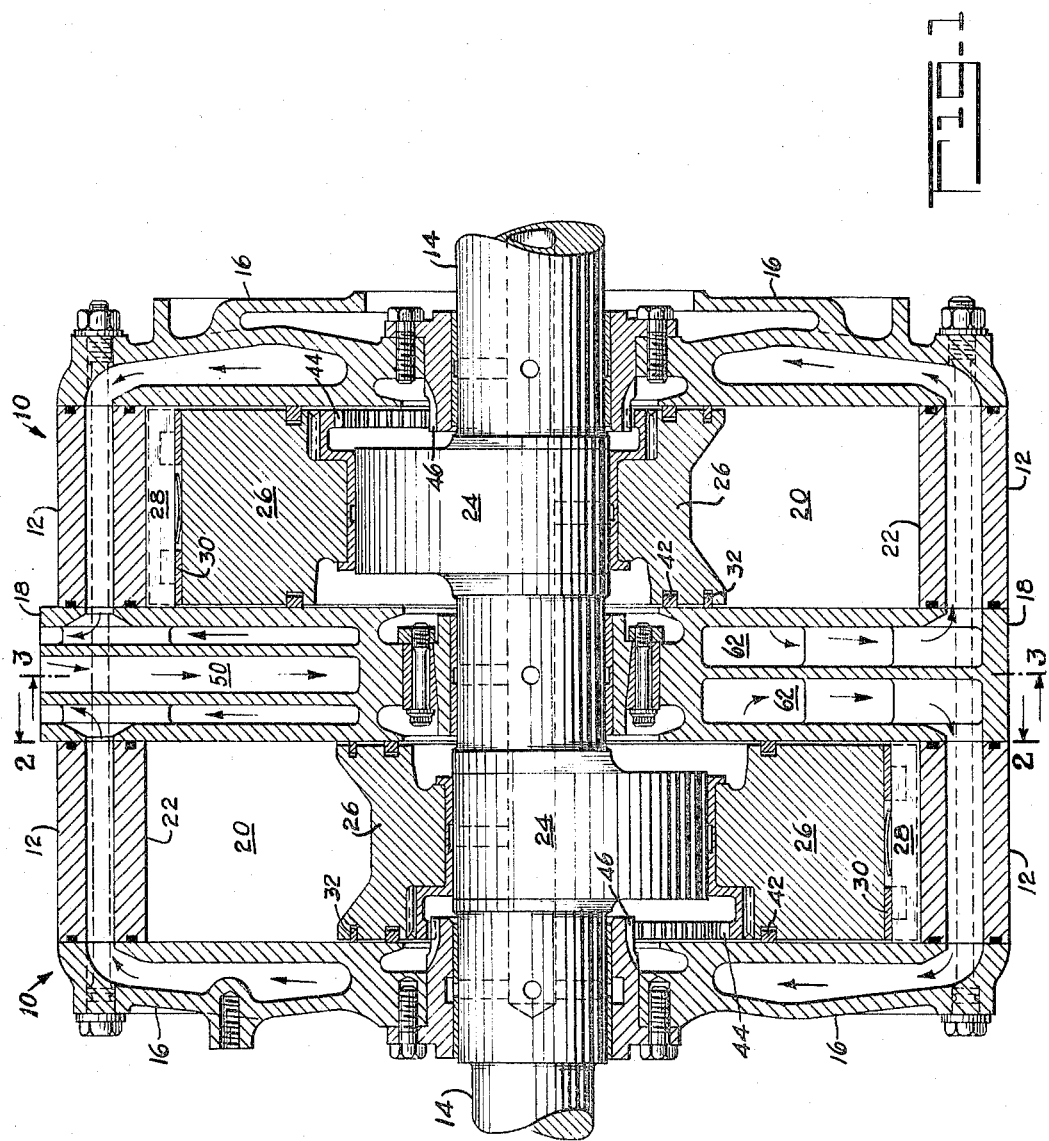
FIG. 1 is an axial sectional view of a rotary combustion engine embodying the invention.

Referring to the drawing, in FIG. 1 there is shown a multi-unit rotary mechanism which is so arranged so as to function as a rotary combustion engine. The multi-unit rotary combustion engine illustrated in FIG. 1 is composed of a plurality of rotary combustion units each generally designated at 10, said multi-unit engine further comprising a multi-part housing or outer body including a plurality of peripheral walls or rotor housings 12 mounted coaxially with a one-piece rotatable engine shaft 14 which extends through the multi-unit engine. The peripheral walls 12 are axially-spaced along the engine shaft 14 and, at each axial end of the engine, an end wall or housing 16 is interconnected with the adjacent peripheral wall 12. An intermediate housing 18 is interconnected between the adjacent peripheral walls 12 and as can be seen from FIG. 1, the interconnection of the peripheral walls 12, the end walls 16 and the intermediate wall 18 serving to define two axially-spaced cavities 20. As further illustrated in FIG. 2, the inner surface 22 of the peripheral walls 12 has a multi-lobed profile which preferably is basically an epitrochoid.

The shaft 14 extends through the engine and, as stated above, is mounted coaxially with each of the cavities 20. The shaft 14 has a plurality of eccentric portions 24 formed thereon, there being one such eccentric portion aligned with each of the cavities 20. Rotatably mounted on each of the eccentric portions 24 is a rotor 26 which rotors 26 each have a plurality of circumferentially-spaced apex portions each having a radially-movable seal strip 28 mounted therein for sealing engagement with the inner surface 22 of the associated peripheral wall 12. Intermediate seal bodies 30 are disposed at the ends of the apex portions to provide for sealing cooperation between the apex seal strips 28 and side seal members 32 in each side face of the rotors which have sealing engagement with the respective inner faces of the end walls 16 and intermediate housing 18. Working chambers 34 are formed between the inner surface 22 of the peripheral walls 12 of each cavity 20 and the outer peripheral lobed surface of each rotor 26 between its adjacent apex portions. As each rotor rotates, the working chambers 34 vary in volume relative to its respective housing. Each cavity 20 is provided with an intake port 36 in a respective end wall 16 for admitting air or fuel-mixture to the working chambers 34 for combustion therein. It should be understood however, that the intake port 36 may also be located in the peripheral walls 12 instead of in the end walls 16. An ignition means which may comprise a spark plug 38 is provided for each cavity for igniting the fuel-air mixture and an exhaust port 40 is also provided in the peripheral wall for each cavity for expelling the burnt gases from the engine so that during engine operation the phases of intake, compression, expansion and exhaust are carried out in each of the respective units of the engine. An oil seal 42 is also provided in the rotor and is disposed radially inwardly of the side face seals 32 in order to prevent any oil from leaking radially outwardly into the working chambers 34.

Each rotor 26 has an internally toothed gear 44 secured thereto which gear is coaxial with said rotor 24 and said gear 44 is in meshing engagement with an externally toothed gear 46 secured to an end wall 16 of the outer body to help maintain the proper rotative position of the rotor 26 relative to the outer body during engine operation. The externally toothed gear 46 is coaxial with the engine shaft 14. For a more detailed description of the basic construction of a rotary combustion engine of the type disclosed herein, reference may be made to U.S. Patent No. 3,007,460, issued to Max Bentele on November 7, 1961.

It will be apparent that, as the rotor 26 in each of the rotary combustion units rotates relative to its peripheral wall 12, the intermediate wall 18 and the end wall 16, combustion takes place in the region adjacent the spark plug 38 with the hot gases being transferred from this region to the exhaust port 40 for discharge from the engine. It will be obvious that the region between the exhaust port and the place wherein combustion takes place will become substantially hotter during engine operation than for example, the region between the intake port 36 and the region of combustion so that it may be said there are substantial variations in heat input around the periphery of the outer body. It is of course desirable to eliminate such variations in heat input in order to maintain the proper shape of the outer body and to prevent undue thermal stresses from causing damage to said outer body. In multi-unit engines there is the additional consideration of maintaining the proper temperature balance between the units of said multi-unit engine so as to permit the engine to operate without variation in the operating conditions between the individual units of said engine. Therefore, the cooling system must be so arranged as to provide maximum cooling efficiency for each of the units of said multi-unit engine by minimizing the temperature variation between the units in the system and by providing substantially the same degree of cooling for each of said units.

Referring again to the drawings, in particular FIGS. 3–10, it will be seen that the common intermediate wall 18 is provided with an inlet 50 for receiving a liquid coolant therein and adjacent to and surrounding a portion of said inlet 50 there is provided an outlet 52 for discharging heated coolant from said engine. The coolant is supplied under pressure to the inlet means 50 by a suitable means, not shown, wherein it is received in an inlet manifold 54 in said intermediate wall 18. As can be seen from the drawings the inlet 50 forms a chute-like structure with an opening at its downstream end communicating with the inlet manifold 54. A series or group of passageways 56 are provided in the intermediate wall 18, the peripheral walls 12 and each of the end walls 16 which passageways provide an axial cooling path leading axially outwardly from said inlet manifold 54 to a manifold 58 in each of the end walls 16. The group of passageways 56 pass through the portion of each of the peripheral walls 12 wherein combustion is initiated, which region has substantially the highest heat input relative to the remainder of the peripheral walls. It will be apparent that, since the liquid coolant is relatively fresh as it flows into the passageways 56, the most effective cooling will take place in this region. As the liquid coolant collects in the manifolds 58 of the end walls 16 from said passageways 56, it will be supplied to a group of passageways 60 leading axially inwardly from said manifolds 58 through said peripheral walls 12 toward said intermediate wall 18 and into a distribution manifold 62 in said intermediate wall 18 with said distribution manifold 62 being divided in half by a partition or wall 63 so that the liquid coolant from each of said end walls 16 will flow to a distribution manifold 62 on its respective side of the intermediate wall 18. The partition 63 in the distribution manifold 62 serves to smoothly guide the liquid coolant from each of the peripheral walls 12 to the next series of passageways 64 leading from the intermediate wall on each side of said partition 63. In absence of the partition 63, the liquid coolant flowing from each peripheral wall 12 into the manifold 62 would be subjected to substantial turbulence within the manifold and the smooth flow of the liquid coolant through the passageways would be interrupted. The coolant from each side of the distribution manifold 62 is then smoothly supplied to a group of passageways 64 leading from said common intermediate wall 18 axially outwardly through the peripheral walls 12 and into a collecting manifold 66 in each of said end walls 16. The heated liquid coolant will then be collected in said manifold 66 and carried axially back toward the intermediate wall 18 through a plurality or group of discharge passageways 68 wherein it will be collected in a discharge manifold 70 for discharge from said multi-unit rotary combustion engine through the cooling outlet 52. Each passageway 56, 60, 64 and 68 leading to or from the intermediate wall 18 and an end wall 16 is equal in length and area, respectively, to an associated passageway leading to or from the intermediate wall to the other of said end walls so that pressure drops between the units of the multi-unit rotary combustion engine are substantially eliminated. It will also be seen that the inlet means is located adjacent to the relatively hot portion of the outer body and the relatively coldest liquid will be substantially immediately supplied to this region wherein the highest degree of cooling is required. As the liquid coolant is supplied, it flows back and forth through the relatively hot portion in a "stitch-like pattern" until it enters the exhaust manifold section 66 in each of the end walls wherein it is then substantially immediately directed back towards a discharge manifold 70 in the intermediate wall 18 for discharge from said engine. Thus, the most effective cooling is provided in the region of the outer body wherein it is most needed for substantial minimizing temperature variations around the periphery of the outer body.

It will be seen from the above description, that a cooling system is provided for a multi-unit rotary combustion engine wherein temperature variations between the units of said multi-unit engine are substantially eliminated and the temperature conditions of each of the units will be substantially the same. This of course results in a more efficient operation of the entire engine. By supplying and draining the liquid coolant at a substantially central point in the engine, a relatively simple and compact supply manifold structure may be used which eliminates the requirement of multiple joints which are associated with complex systems. The relatively simple connections that may be used for the invention eliminates the possibility of leaks in said system while permitting a savings in weight and overall engine dimensions.

While we have described our invention in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A liquid cooling system for the outer body of a rotary combustion engine having at least two units with said outer body having a first portion exposed to relatively high heat input and a circumferentially-spaced portion exposed to relatively low heat input, said outer body including a pair of coaxially-spaced peripheral walls, an intermediate wall and a pair of coaxially-spaced end walls disposed at opposite ends of the outer body such that each engine unit includes one of said peripheral walls and its adjacent end wall and such that said intermediate wall is common to the two engine units, said outer body having first and second liquid coolant passage systems, one for each of the engine units, each said passage system including a plurality of circumferentially-spaced but serially connected liquid coolant passage groups extending from said intermediate wall through the peripheral wall of its engine unit to its end wall for flow of liquid coolant back and forth through each peripheral wall between said intermediate wall and the associated end wall, inlet means provided in said intermediate wall for supplying liquid coolant to the inlet ends of the passages of both said passage systems, and outlet means provided in said intermediate wall for discharge of said liquid coolant from the outlet ends of the passages of both said passage systems.

2. A liquid cooling system as recited in claim 1 wherein said inlet means includes an inlet manifold in said intermediate wall with said inlet manifold being common to both said passage systems and said outlet means includes an outlet manifold in said intermediate wall with said outlet manifold being common to both said passage systems so that said inlet manifold serves to supply liquid coolant to the passages of both said passage systems and said outlet manifold serves for discharging the liquid coolant from both said passage systems.

3. A liquid cooling system as recited in claim 2 wherein said intermediate wall includes an intermediate manifold for changing the direction of flow of liquid coolant from each end wall to said intermediate wall back toward each end wall, said intermediate manifold including a partition for guiding the liquid coolant flowing from a first series of passages of each passage system toward said intermediate wall to a second series of passages of each passage system for flow of the liquid coolant away from said intermediate wall and toward an associated end wall.

4. A liquid cooling system as recited in claim 3 wherein said inlet manifold and said intermediate manifold are disposed in said first portion of said outer body such that said first portion of said outer body is provided with the relatively coldest liquid coolant.

5. A liquid cooling system as recited in claim 1 wherein in each liquid coolant passage of said first passage system has a corresponding liquid coolant passage with substantially the same flow area in said second passage system.

6. A liquid cooling system for the outer body of a rotary combustion engine having at least two units with said outer body having a first portion exposed to relatively high heat input, said outer body including a pair of coaxially-spaced peripheral walls, an intermediate wall and a pair of coaxially-spaced end walls disposed at opposite ends of said outer body such that each engine unit includes one of said peripheral walls and its adjacent end wall and such that said intermediate wall is common to the two engine units, said outer body having first and second liquid coolant passage systems, one for each of the units, each said passage system including a plurality of circumferentially-spaced serially connected liquid coolant passage groups extending from said intermediate wall through the peripheral wall of its engine unit to its end wall for flow of liquid coolant back and forth through each peripheral wall between said intermediate wall and the associated end wall, said intermediate wall including an inlet manifold common to both said first and second passage systems and communicating with each passage system for supplying a liquid coolant for flow from said inlet manifold toward each end wall, an outlet manifold common to both said first and second passage systems and communicating with each passage system for discharging liquid coolant from both said passage systems and an intermediate manifold disposed between said inlet and outlet manifolds, said intermediate manifold having a partition dividing said intermediate manifold into first and second manifold portions, there being one manifold portion for each passage system, and each manifold portion interconnecting at least two groups of passages of its associated passages system for reversing the flow of liquid coolant from one of said groups of passages to the other.

7. A liquid cooling system as recited in claim 6 wherein each end wall includes at least two individual manifold sections with each manifold section in each of said end walls serially connecting at least two groups of passages of each passage system for changing the direction of flow of liquid coolant from said intermediate wall, to a direction of flow back toward said intermediate wall.

References Cited by the Examiner

UNITED STATES PATENTS

| | | |
|---|---|---|
| 1,247,973 | 11/1917 | Lanteig. |
| 1,434,446 | 11/1922 | McQueen. |
| 2,075,561 | 3/1937 | Wellensiek. |
| 3,134,537 | 5/1964 | Bentele et al. _____ 230—210 |

FOREIGN PATENTS 1,321,321  2/1963  France.

MARK NEWMAN, *Primary Examiner.*

F. T. SADLER, *Assistant Examiner.*